UNITED STATES PATENT OFFICE.

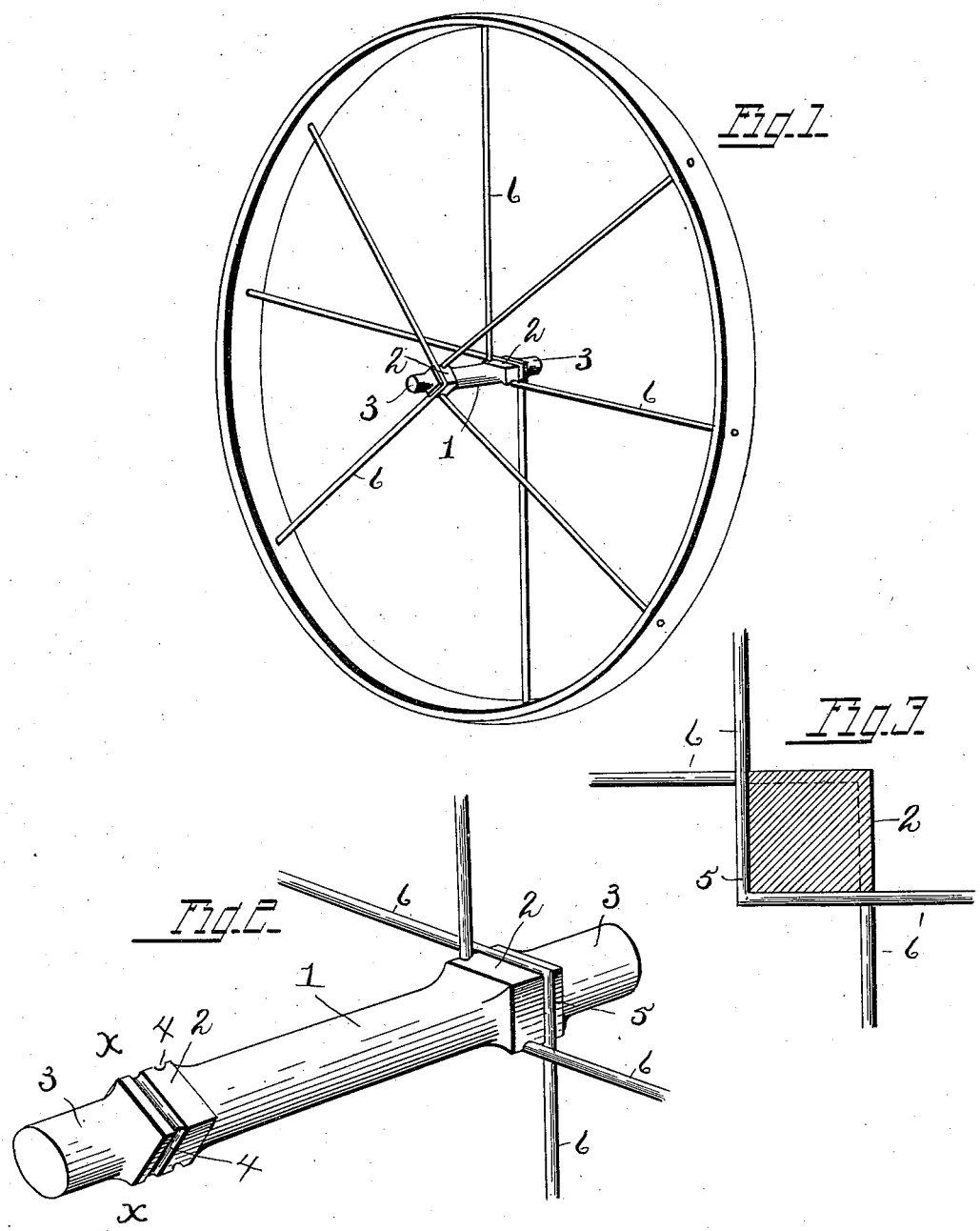

FRANK J. COOPER, OF TOLEDO, OHIO, ASSIGNOR OF ONE-HALF TO CHRISTAIN STORZ, OF SAME PLACE.

METAL WHEEL.

SPECIFICATION forming part of Letters Patent No. 577,423, dated February 23, 1897.

Application filed September 8, 1896. Serial No. 605,089. (No model.)

*To all whom it may concern:*

Be it known that I, FRANK J. COOPER, of Toledo, county of Lucas, and State of Ohio, have invented certain new and useful Improvements in Metal Wheels; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a metal wheel of that character used upon wheelbarrows, children's carriages, velocipedes, &c., and has for its object simplicity of construction and great rigidity, as well as a minimum expense of manufacture.

The invention consists in a hub having enlarged portions at each end, the enlarged portions being square in cross-section with the squares in different horizontal planes, each square having grooves formed therein in different transverse planes, the grooves of each plane embracing two sides of the square with return-bend spokes bent at an angle at their centers to seat within the grooves.

In the drawings, Figure 1 is a perspective view of the wheel constructed in accordance with my invention. Fig. 2 is an enlarged perspective view of the hub, and Fig. 3 is a sectional elevation taken at a point indicated by the line *x x*, Fig. 2.

1 designates the hub, which is formed with the squared enlargements 2 near each end, the outer ends being circular in cross-section to fit in the bearings of the vehicle to which the wheel is secured.

The enlargements 2 are shown as located upon each end of the hub and squared in cross-section in different horizontal planes to allow the spokes to radiate from different centers upon the hub with relation to each end.

Upon opposite two sides and in different planes are grooves 4, in which fit the angled bends 5 of the return-spokes 6, the outer ends of which are secured to the rim for the proper suspension of the wheel.

As shown in the drawings, I employ a squared end upon the hub which constructs a wheel of four spoke-sections, and consequently of eight spokes, although, if desired, I may form the enlarged end hexagonal or octagonal or in any shape in cross-section and groove the same as described, which construction allows of the use of any number of spokes to secure the desired strength in the wheel.

It will be readily seen that I have provided a wheel of few parts and of great rigidity and one in which the expensive manufacture is reduced to a minimum, as in constructing the wheel it is only necessary to assemble the spokes around the hub and to upset the ends in the rim, which will tighten the same and secure the wheel in assembled relation.

An essential feature of the invention resides in the fact of the angled grooves in different transverse planes with the angled portion of the spokes resting within the grooves, whereby there is not only a direct tension in a radial line therefrom to the rim, but each spoke is located independently as to contact with the hub, whereby the spoke may be drawn to the desired tension while in full embrace of the hub without the possibility of lateral movement or decrease of tension when subjected to strain.

What I claim is—

In a metal wheel, a hub having enlarged portions at each end rectangular in cross-section with the squares in different planes, each square having grooves formed therein in different transverse planes, the grooves of each plane embracing two angles of the rectangular end with return-bend spokes bent at an angle at their centers to seat within the grooves, and the outer ends secured in the wheel-rim.

In testimony that I claim the foregoing as my own I hereby affix my signature in presence of two witnesses.

FRANK J. COOPER.

Witnesses:
 CARROLL J. WEBSTER,
 CHRISTIAN STORY.